UNITED STATES PATENT OFFICE.

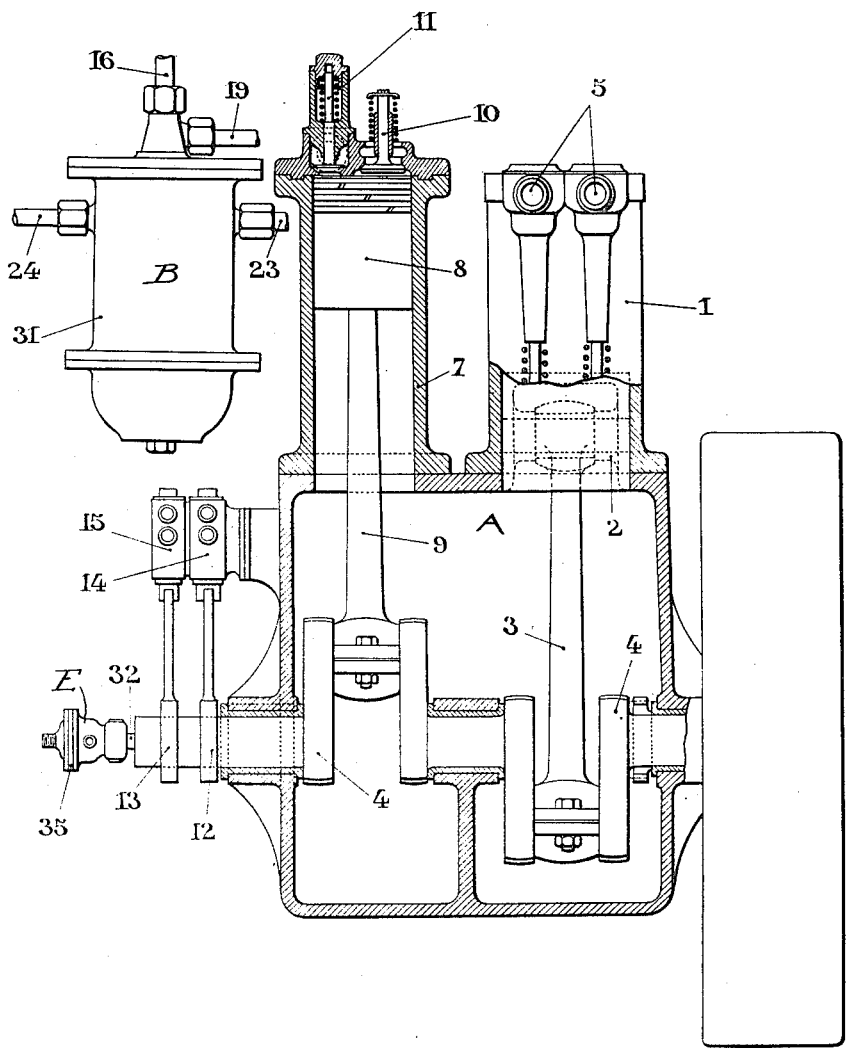

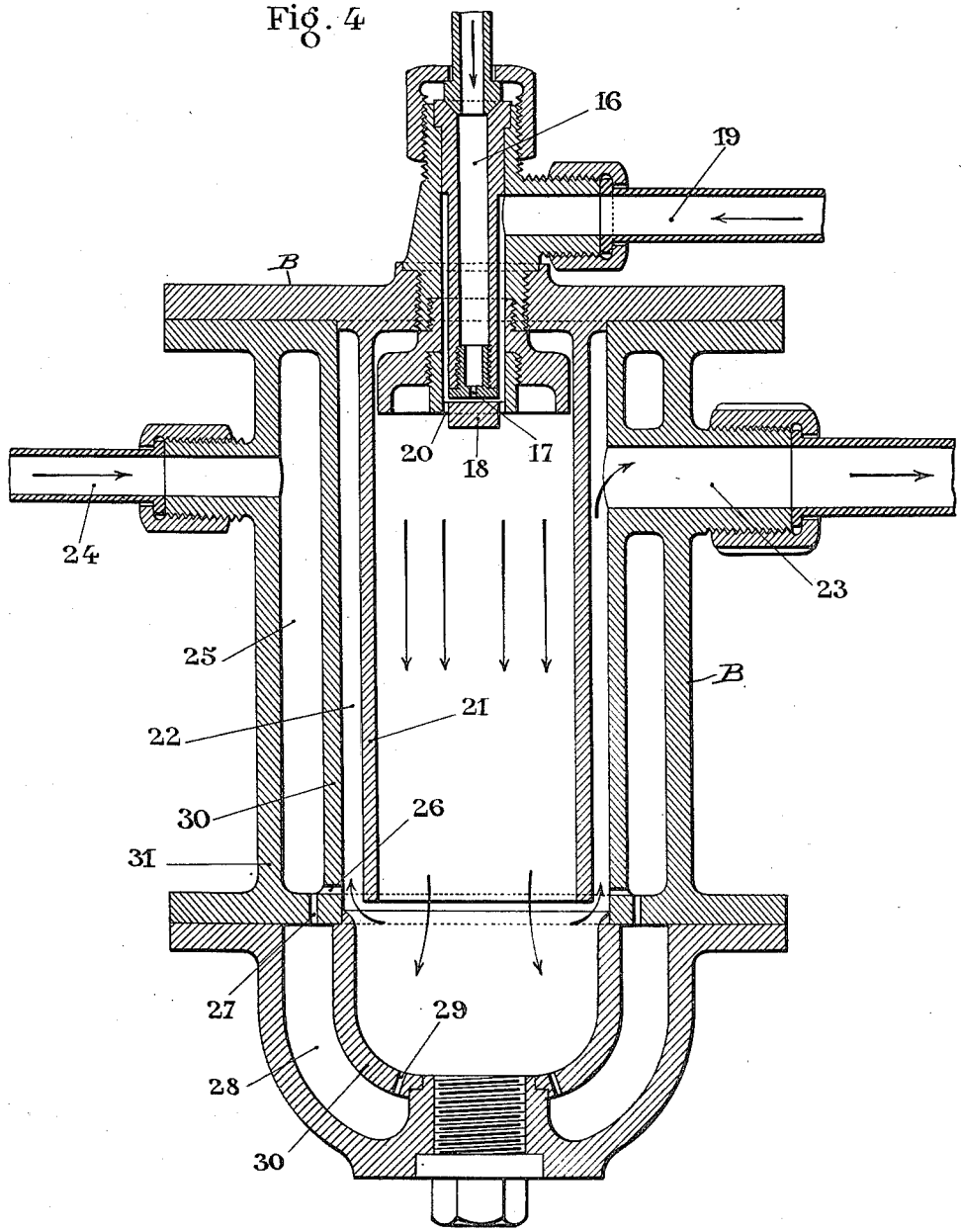

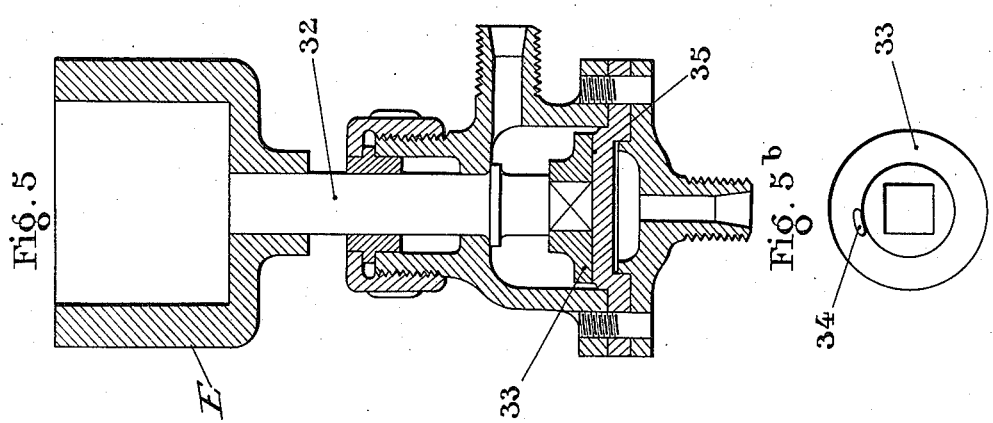

CHARLES EMMANUEL YVONNEAU, OF PARIS, FRANCE.

INTERNAL-COMBUSTION ENGINE.

1,294,746.  Specification of Letters Patent. Patented Feb. 18, 1919.

Application filed April 19, 1916. Serial No. 92,193.

*To all whom it may concern:*

Be it known that I, CHARLES EMMANUEL YVONNEAU, a citizen of the French Republic, residing at 35 avenue du Parc Montsouris, Paris, France, have invented new and useful Improvements in Internal-Combustion Engines, of which the following is a specification.

Internal combustion engines in which the combustion takes place in an element separate from that in which the motor fluid acts have already been suggested. In such constructions, the products of combustion are mixed with a certain quantity of water vapor produced by projecting water into the combustion gases in order to lower the temperature of the latter. The mixture of gas and water vapor then serves as the motive fluid in the engine, which thus becomes a kind of steam engine.

The combustion takes place in an element called the generator. The air is supplied either from a reservoir where it is compressed by the engine itself and projected on to the burner, or directly, or through a reservoir. Ignition is effected either automatically by the heat produced in the compression, in cases in which the air is compressed to a high pressure, and projected directly on to the burner, or by means of an incandescent body, a cartridge or an electric spark.

Of these various projects one has been adopted in practice in which the air is supplied from a reservoir. The flow of air is continuous as is also the flow of fuel, which is atomized by the air jet and, when once the ignition has been effected, the combustion continues in the manner of a blowpipe burning in a closed vessel. This method is applied only in engines serving for the propulsion of automobile torpedoes, where efficiency is immaterial. It is obvious that the employment of these engines for industrial purposes, where economy is constantly assuming greater importance, is impracticable. In point of fact, in compressing air in an intermediate reservoir intended for supplying it to the burner, almost the whole of the heat of compression is lost. This loss is greater in proportion as the compression is higher. Now the efficiency of an engine is higher in proportion as the compression is higher, and obviously the efficiency cannot be improved by a high compression with this method.

It therefore follows that only the method consisting in forcing the air into the generator by a compressor actuated by the motor itself in order that this air may serve as the comburent for the fuel, has any chance of furnishing a practical thermic motor. As the compressor has to compress the air to a considerable pressure, obviously only a reciprocating piston compressor will fulfil requirements. In a reciprocating compressor, however, the compressed air is only supplied intermittently, merely during a fraction of the stroke of the piston. This delivery period is shorter in proportion as the compression is greater. It is therefore essential that the injection of the fuel should coincide with the forcing of the air into the generator. If the means adopted do not provide for this simultaneously in the supply of air and injection of fuel, neither the atomization nor the ignition can take place. With this method the combustion is therefore not continuous, as with the method employed for automobile torpedoes, but intermittent and accordingly the ignition should occur at each injection of fuel, either as a result of the heat produced by the compression or of some artificial means.

It is this difficulty in obtaining the simultaneity in the supply of air and the injection of the fuel which enables combustion to take place that has hitherto prevented the construction of a thermic engine presenting the flexibility of the steam engine and the efficiency of an internal combustion engine.

The present application for patent relates to a method providing for the atomization and the combustion in a generator, into which the compressed air is delivered directly and in which the ignition of the fuel is produced by the heat of compression of the air.

The invention therefore relates to an internal combustion engine in which the motive fluid is composed of a mixture of combustion gas and steam produced in an independent generator by the combustion of a combustible liquid such as petroleum, the heavy oils or other liquid fuels under the influence of a jet of highly compressed air at a high temperature and in the presence of an appropriate quantity of water.

In this manner a mixture of gas resulting from the combustion of the petroleum or other liquid fuel and of steam is obtained and this mixture is employed in the motor cylinder which this acts simultaneously as an internal combustion engine and, to a certain extent as a steam engine, the presence of the steam improving the flexibility of the engine.

In carrying the invention into practice, the air compressor coupled with the engine proper, draws in atmospheric air and compresses it to the adequate pressure which is approximately 30 to 35 kilos per square centimeter. This air, which is heated by the compression, is discharged into the generator. Into this generator the liquid fuel is injected and this ignites in contact with the hot air; water is also injected, which, in vaporizing, lowers the temperature of the gases produced by the combustion and takes part in the composition of the motive mixture.

The novel engine will now be described with reference to the accompanying drawing, in which:

Figure 1 represents a vertical longitudinal section of the engine proper, of the compressor and of the generator, the piping establishing communication between these elements being omitted.

Fig. 4 shows the generator in section.

Fig. 5 is a sectional view of the mechanically driven distributer E for the liquid fuel, which is hereinafter termed petroleum.

Fig. 5$^b$ is a plan view of the circular slide disk of this distributer.

Figure 6:
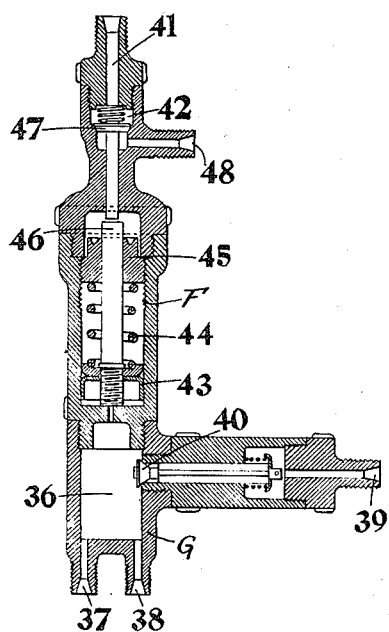
Figure 2:
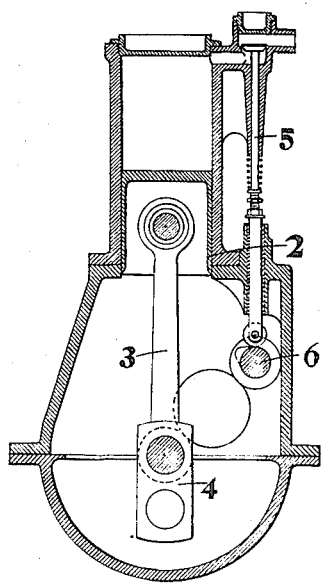
Fig. 2 shows the engine in vertical cross section at right angles to Fig. 1.

Fig. 6 represents the automatic pressure regulator F, G of the petroleum distributing gear.

Fig. 7 shows a regulator for the distribution of petroleum.

Fig. 7$^b$ is a plan view of its slide.

The engine comprises essentially a motor element with one or more cylinders, a compressor, a generator of motive gas, water and fuel pumps, a petroleum distributer, a pressure regulator for the same and a governor for the petroleum distribution, with a radiator nest, a water reservoir, a liquid fuel reservoir and a compressed air reservoir.

In the diagammatic representation contained in the accompanying drawing, the engine comprises a single motor cylinder 1 whose piston 2 acts upon the crank shaft 4 by the intermediary of a connecting rod 3. The motive fluid can be admitted to the driving cylinder, and exhausted therefrom after it has acted upon the piston, by means of valves 5 operated by a cam shaft 6, as in the example illustrated, or by means of slide valves, the engine being governed in a known manner which it is unnecessary to describe.

The compressor comprises a cylinder 7 whose piston 8 is connected by a rod 9 with a crank of the shaft 4 keyed at the appropriate angle relatively to that of the driving cylinder for obtaining the compression and exhaust phases at the proper moment.

The compressor cylinder comprises an automatic valve 10 for the suction of atmospheric air and an automatic valve 11 for exhausting the compressed air.

Eccentrics 12—13 controlling the water and fuel pumps 14 and 15 are keyed upon the shaft 4 and this shaft 4 also actuates the petroleum distributing gear which is shown in detail in Fig. 5.

The apparatus generating the gaseous motor fluid, which is represented in detail in Fig. 4, consists of a vessel 30 in which is arranged a bell 21 in such a manner that an annular space 22 exists between this bell 21 and the vessel 30.

The vessel 30 is arranged in a casing 31 and in the annular space 25 between these two parts the water which enters through the pipe 24 and issues in the form of steam with the combustion gases by the pipe 23, is able to circulate.

The petroleum reaching the nozzle 16 passes through the orifice 17 and spreads over the surface of the plug 18. The jet of compressed air supplied through the pipe 19 forces it through the circular orifices 20 into the bell 21 of the generator. The air atomizes the petroleum, mixes with it and ignites it. The gases of this combustion descend in the bell, pass around it and are caused to ascend in the annular space 22, to issue through the pipe 23 and proceed to the motor.

Through the pipe 24 the water reaches the circular jacket 25 and enters the combustion chamber through the circular orifices 26 and it also passes through the circular orifices 27 into the space 28 which it is able to leave through the orifices 29 and to enter the combustion chamber at these points also.

On the one hand, therefore, the combustion gases encounter water issuing through the orifices 29, and on the other hand, water escaping through the orifices 26; they become cooled and vaporize this water which thus takes part in the composition of the gaseous mixture constituting the motor fluid.

It will be noted that the generator may be constituted by one or more bells such as 21, each comprising a burner and all of them arranged in a combustion chamber formed by a vessel such as 30.

Fig. 5 shows in vertical section the mechanically driven apparatus E, for distributing the liquid fuel actuated by the shaft 4 of the engine directly or by the intermediary of appropriate transmission gear.

Fig. 5^b shows the circular slide disk in plan.

In the example under consideration, the shaft 32 of the distributer for the petroleum is mounted directly upon the shaft 4 and rotates with it. A disk 33 forming a circular slide valve is fixed to this shaft 32. In this slide valve 33 is formed an aperture 34 corresponding to the induction period. The slide valve disk bears against a fixed surface 35 comprising two or four holes, according as the engine comprises two or four cylinders. At each revolution of the driving shaft, and consequently of the slide valve, the latter uncovers these orifices at the moment of the delivery of the air by the compressor, thus permitting of the passage of the petroleum to the generator.

Combined with this liquid fuel distributer are a pressure regulator for the petroleum distributer and an automatic regulator.

Figure 3:
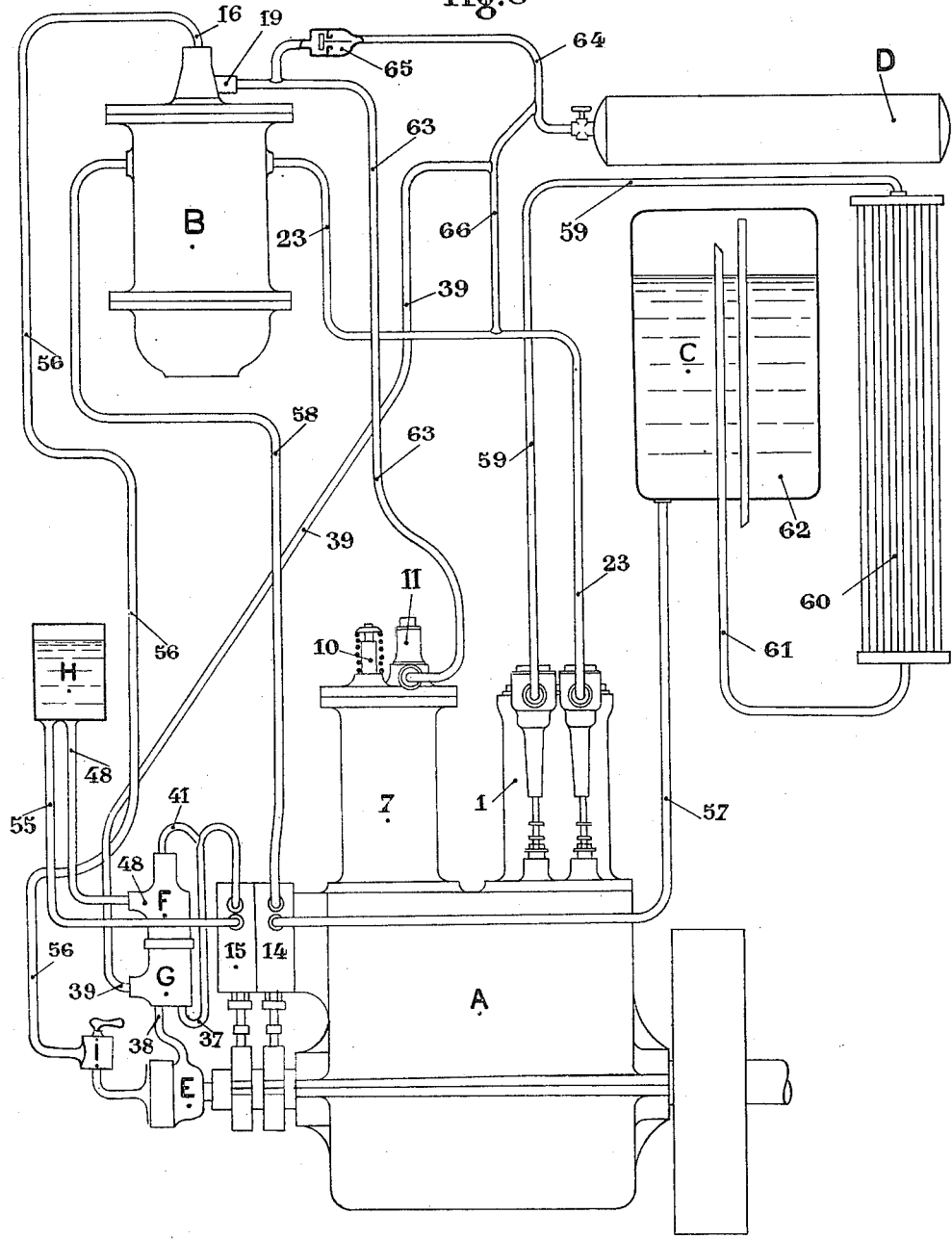
Fig. 3 is a general diagrammatic view of the elements.

Fig. 6 represents in section this apparatus which is indicated F, G in the diagram Fig. 3; it comprises a body forming a chamber 36 communicating through a port 37 with the petroleum pump 15 and by a port 38 with the mechanically driven petroleum distributer E described above, and through a port 39, through the non-return valve 40 with the air reservoir D. The air entering the chamber 36 establishes there a pressure equal to that of the air reservoir and when the petroleum enters through the port 37 it is caused to pass through the port 38 and proceed to the distributer. The pipe conducting the petroleum from the pump 15 into the port 37 also communicates with the pipe 41 supplying petroleum to the chamber 42. The delivery from the pump being greater than the quantity of petroleum required by the engine, the pressure in the chamber 36 tends to rise. This pressure acting upon the piston 43 influences the spring 44 which can be adjusted by means of the screw 45. The rod 46 of this piston exerts a thrust upon the stem of the valve 47, which, in opening, enables the petroleum to return through the pipe 48 to the petroleum reservoir, It is thus possible, by regulating the tension of the spring 44, to maintain a constant pressure in the chamber 36 whatever the delivery from the petroleum pump may be.

Fig. 7 shows in section the regulator I of the petroleum distribution, placed on the pipe coming from the distributer E and operated by a speed governor or in any other way.

Fig. 7^b is a plan view of the slide valve.

An examination of the petroleum distributer shows that the time during which the slide uncovers the distribution orifices is longer in proportion as the engine turns more slowly. In order to obviate this inconvenience, a regulator I is interposed between the petroleum distributing apparatus E (represented in Fig. 5) and the generator; this regulator consists of a slide valve 49 rigid with a shaft 50. This slide comprises a slot 51 which uncovers a series of orifices 53 in a fixed plate 52.

By rotating the slide 49 a larger or a smaller number of these orifices affording a passage for the petroleum can be uncovered. An arm 54 connected with the shaft 50 and with the slide can be acted upon in such a manner that the more rapidly the engine turns the greater the number of orifices uncovered by the slide, and vice versa. In this manner the fuel supply is always maintained proportionate to the speed of the engine.

Fig. 3 diagrammatically represents as a whole the apparatus composed of the engine proper with the compressor indicated as a whole by A, the motor gas generator indicated as a whole by B, the water reservoir indicated by C, the compressed air reservoir indicated by D, the mechanically operated petroleum distributer indicated by E; the automatic pressure regulator of the petroleum distributer indicated by F G, the petroleum reservoir indicated by H, and the governor by I.

The petroleum or other liquid fuel pump 15 receives through a pipe 55 the liquid fuel from the reservoir H and supplies it through the pipe 56 to the fuel nozzle 16 of the generator in passing through the mechanically driven petroleum distributer E, the automatic pressure regulator F G and the governor I.

The water pump 14 receives through a pipe 57 water from the reservoir C and delivers it through a pipe 58 to the generator B.

The gaseous fluid produced in the generator proceeds through a pipe 23 to the inlet valve of the driving cylinder.

The exhaust gases of the driving cylinder proceed through a pipe 59 to a condenser nest 60 and the water of condensation produced in the latter and also the residual gases pass through a pipe 61 to the reservoir C whence the non-condensable gases can escape through a pipe 62.

The general operation is as follows:

The compressor 7 draws atmospheric air through the automatic valve 10 and, during the up-stroke of its piston, discharges this air through the automatic valve 11 and the pipe 63 into the nozzle 19 of the generator. The petroleum or other liquid fuel entering the generator through the nozzle 16 is atomized and kindled by the jet of air from the nozzle 19 by reason of the high temperature of this air. The gases resulting from the combustion of the liquid fuel in contact with the compressed air encounter the jet of water supplied by the water pump, vaporize this water and themselves become cooled in such a manner that their temperature is reduced to approximately 300 to 400° C. It is this mixture of combustion gases and of steam that supplies the effort on the piston of the driving cylinder.

After the gaseous fluid has performed its work, it is exhausted at the outlet from the driving cylinder, through the conduit 59 into the condensing nest 60. The vapor condenses and proceeds through the conduit 61 into the water reservoir C while the non-condensable gases escape therefrom through the overflow pipe 62.

The water pump 14 draws the water through the conduit 57 from the reservoir C and delivers it to the generator through the conduit 58.

It will be noted that, in this apparatus, the compression of the air, the combustion of the liquid fuel in contact with the air and the work of the gaseous mixture produced, take place in three different elements which presents important advantages.

In point of fact, this engine may be used for purposes for which internal combustion engines of the Diesel type are not applicable. One important application is automobile traction which necessitates engines developing high mass power and consequently running at a high speed.

As stated above, a compressed air reservoir D serves for starting the engine by supplying a suitable quantity of compressed air to the generator by means of the pipe 64 connected with the pipe 63. Upon the pipe 64 is interposed a non-return valve 65 which prevents the air from the reservoir from entering the generator as soon as the compressor commences to supply air. The compressed air can also be supplied directly to the engine by the pipe 66 branched from the pipe 64.

It will be understood that the general view of the apparatus in the accompanying drawing is diagrammatic.

As has been stated, the engine proper may comprise a puppet or a slide valve distribution; it may be single or double acting and comprise one or more cylinders; it may also be reciprocating or rotary, or the motor might consist of a turbine.

The compressor cylinder and the driving cylinder may be keyed upon one and the same shaft or be arranged in tandem, vertically or horizontally. The compressor may also comprise one cylinder or a plurality of cylinders.

I claim:—

1. An engine operating with mixed products of combustion and steam and comprising a separate motor, compressor and generator, means for delivering liquid fuel and water to the generator, means for delivering air directly to the generator under a high degree of compression, a liquid fuel distributing apparatus, a pressure regulator for the liquid fuel distributing apparatus, and a liquid fuel distribution regulator, substantially as described.

2. An engine operating with mixed products of combustion and steam and comprising a separate motor, compressor and generator, means for delivering liquid fuel and water to the generator, means for delivering air directly to the generator under a high degree of compression, a distributing apparatus into which the liquid fuel is supplied, said distributing apparatus comprising a rotary slide valve provided with suitable apertures moving over a stationary plate having corresponding apertures, and means for actuating the rotary slide valve, substantially as described.

3. An engine operating with mixed products of combustion and steam and comprising a separate motor, compressor and generator, means for delivering liquid fuel and water to the generator, means for delivering air directly to the generator, under a high degree of compression, a distributing apparatus for the liquid fuel, a pressure regulator for the said distributing apparatus and a distribution regulator comprising a slide valve pierced with holes and moving relatively to a surface which is also provided with holes, and means for controlling the said slide valve, substantially as described.

4. An engine operating with mixed products of combustion and steam and comprising a separate motor, compressor and generator, means for delivering liquid fuel and water to the generator, means for delivering air directly to the generator under a high degree of compression, a distributing apparatus for the liquid fuel, a pressure regulator for the said distributing apparatus comprising a chamber communicating with the pump and with the distributing apparatus as well as with the compressor, and means operating under the pressure within the said chamber for controlling a valve whereby the excess liquid fuel may return to the reservoir, substantially as described.

CHARLES EMMANUEL YVONNEAU.

Witnesses:
 CHAS. P. PRESSLY.
 MIGUEL FEROLO.